United States Patent [19]
Sarton et al.

[11] Patent Number: 4,889,299
[45] Date of Patent: Dec. 26, 1989

[54] DUCT MOUNTING FIXTURE FOR SECURING A DUCT ON A SUPPORT SECTION

[75] Inventors: François Sarton, Totes; Gérard Roby, Bihorel, both of France

[73] Assignee: Legrand, Limoges (Cedex), France

[21] Appl. No.: 565,764

[22] Filed: Dec. 27, 1983

[30] Foreign Application Priority Data

Dec. 27, 1982 [FR] France .................. 82 21807

[51] Int. Cl.[4] .............................................. F16L 3/24
[52] U.S. Cl. ..................................... 248/72; 248/228
[58] Field of Search ................. 248/72, 49, 228; 403/400, 387, 389, 397; 24/573, 458, 457, 590, 591, 453

[56] References Cited

U.S. PATENT DOCUMENTS

| | | | |
|---|---|---|---|
| 3,568,263 | 3/1971 | Meehan | 24/458 |
| 4,353,519 | 10/1982 | Begmet | 248/72 |
| 4,480,360 | 11/1984 | Brugman | 248/72 |

FOREIGN PATENT DOCUMENTS

| | | |
|---|---|---|
| 2717216 | 11/1978 | Fed. Rep. of Germany . |
| 2371074 | 6/1978 | France . |
| 2416577 | 7/1981 | France . |
| 2211993 | 7/1983 | France . |

Primary Examiner—Alvin C. Chin-Shue
Attorney, Agent, or Firm—Charles E. Brown; Charles A. Brown

[57] ABSTRACT

A mounting fixture secures a duct to a generally channel-shaped support section having right angle flanges at the distal ends of its sidewalls. The duct mounting fixture includes a base plate having an outer side defining a bearing plane against which an endwall of a duct is adapted to bear. A well or bush receiving a preferably rotatable latch member is located in a middle zone of the base plate. The latch member is adapted to extend through an opening in the endwall of the duct and grip the endwall. At least two retaining teeth are disposed on the underside of said base plate for cooperation with the right angle flanges of a support section and at least one of the retaining teeth is carried by a resiliently deformable arm. The latch member is contiguous with base plate and permanently held along the axis of the well or bush.

27 Claims, 2 Drawing Sheets

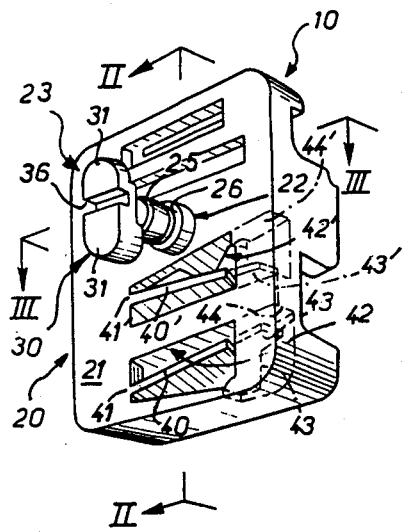
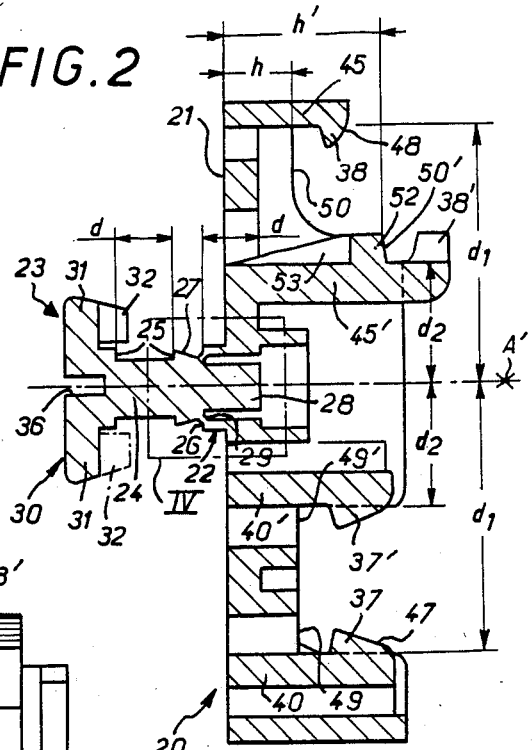
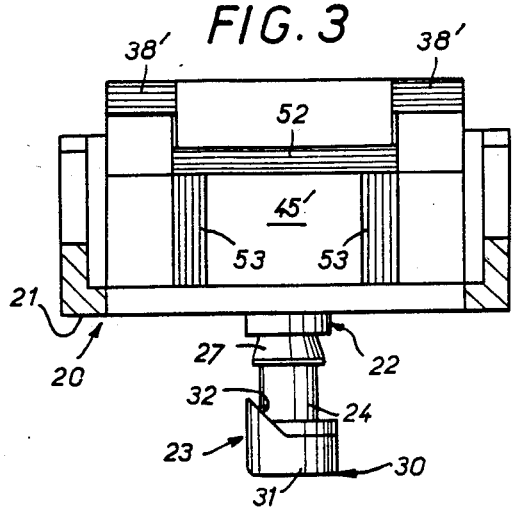
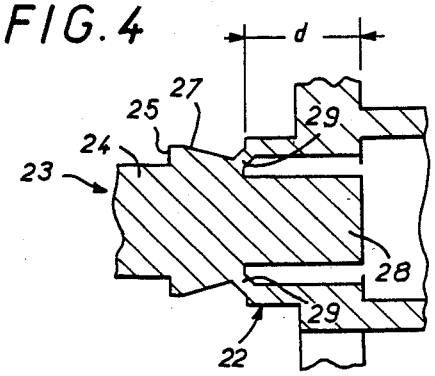
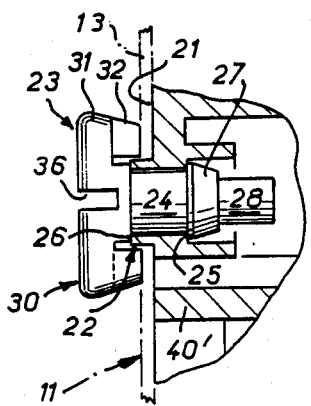

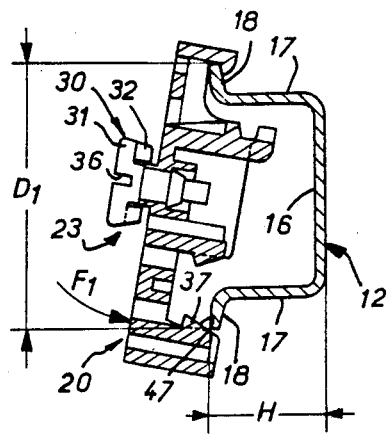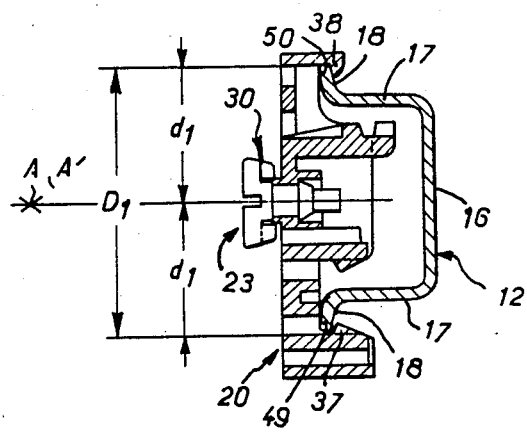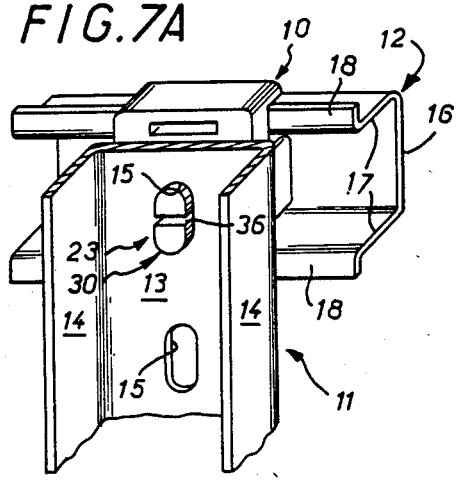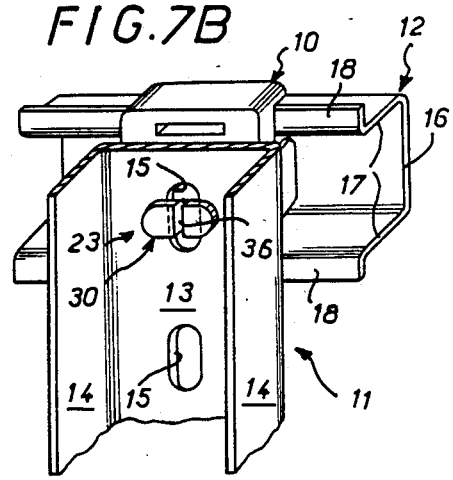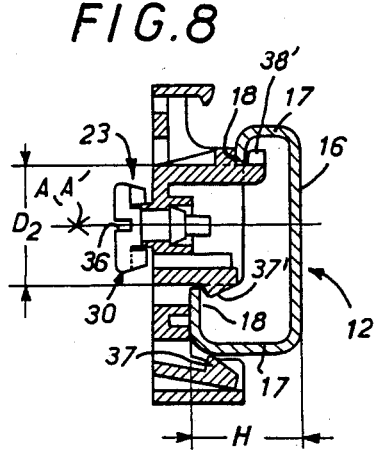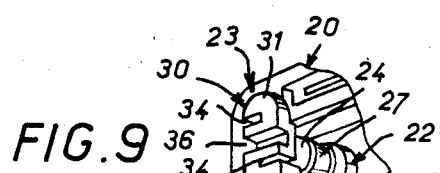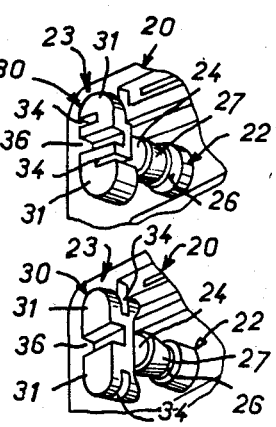

DUCT MOUNTING FIXTURE FOR SECURING A DUCT ON A SUPPORT SECTION

BACKGROUND OF THE INVENTION

The present invention relates generally to ducts of the type currently employed for guiding electric conductors in switch or control boxes, that is, boxes or cabinets for accommodating switch gear or control gear.

Such ducts which are for example made of plastic typically have a U-shaped cross section and along the center line of their endwalls usually have uniformly spaced-apart openings for receiving fastening members necessary for securement to some sort of a support member. These openings are usually longitudinally elongated slots for enabling the adjustment of the position of the duct relative to the support member on which it is to be mounted.

The present invention relates more particularly to the securement of such a duct on a support member which is previously installed in the switch or control box. Conventionally such a support member comprises a perforate plate generally made of metal. It therefore follows that in order to install the ducts a control box must usually be equipped with such a perforate plate.

In addition to control boxes fitted with such perforate plates there are control boxes equipped with a frame comprising an array of support sections, generally made of metal, and of U-shaped cross section, the legs of sidewalls having right-angle flanges or return bends for snapping on the desired switchgear or control gear.

According to standardized arrangements the legs may be of different height and their right angle flanges are usually outwardly directed, away from each other, and at the same level. As a variant such legs are at different heights, and their right angle flanges are then usually inwardly directed toward each other, but at different levels.

In any event heretofore such ducts could not be easily mounted on such a support section.

Moreover the securement of ducts to a perforate plate has usually required the use of screws or even rivets. Such fastening members must be picked out of a batch of screws or rivets loose in a container which is time-consuming and a source of losses of such screws or rivets.

When the fastening members are threaded fasteners or screws, whether of metal or plastic, after passing-through the endwall of the duct and the perforate plate they must receive a nut from the remote side of the perforate plate. Since this requires the electrician or installer to work from the rear of the perforate plate it is in practice inconvenient and relatively time-consuming.

Further, as regards metal threaded fasteners, their use is contrary to safety regulations since they form a conductive link between the electric conductors in the duct and the subjacent perforate plate, to the detriment of the normal uninterrupted insulation of the endwall of the duct.

As for the use of rivets, their use requires special tools whether the rivets are made of metal or plastic.

OBJECT AND SUMMARY OF THE INVENTION

An object of the present invention is to provide a duct mounting fixture for very simply and quickly securing to any kind of generally U-shaped support section with legs having right angle flanges.

According to the invention, there is provided a duct mounting fixture for securing a duct to a generally channel-shaped support section having right angle flanges at the distal ends of its legs or sidewalls. The duct mounting fixture includes a base plate having an outer side or surface defining a bearing plane against which an endwall of a duct to be secured is adapted to bear. Means are provided for receiving a fastening member located in a middle zone of the base plate. The fastening member is adapted to extend through an opening in the endwall of the duct and grip the said endwall. At least two retaining teeth are disposed on the underside of the base plate for cooperation with the right angle flanges of a support section on which a duct is to be secured. At least one of the retaining teeth is carried by a resiliently deformable arm.

The fastening member may, for example, be a self-tapping or threading screw, the means for receiving the screw then comprising a well or bush into which the screw is adapted to bite. A normal screwdriver is sufficient to tighten the screw and since the duct mounting fixture according to the invention is preferably made of plastic, the sought after electrical insulation between the interior of the duct and the subjacent metal support section is thus complied with.

According to a preferred embodiment, however, the duct mounting fixture has an integral fastening member protruding from the outer surface of the base plate for gripping the endwall of the duct after passing through an opening in the endwall.

In practice such a fastening member is preferably a latch member which is turned about 90°, the shank of the latch member being rotatably mounted in the well or bush in the base plate and the head of the latch member having two transverse lobes in the continuation of or alignment with each other.

As above, a mere screwdriver advantageously suffices for installing the latch member and it is provided beforehand on the duct mounting fixture and therefore does not require any additional action to bring it into position.

In practice such a latch member is preferably contiguous with the base plate, that is, it is permanently attached to the base plate. For example, the latch member may be rotatably mounted in the well or bush from the outset. Alternatively, however, the latch member may be formed in one piece with the plate, attached thereto by continuous or discrete frangible connecting means. The entire duct mounting fixture is then of one-piece molded plastic construction. To make the latch member rotatable it is driven down the well or bush thereby rupturing or severing the frangible connecting means previously joining the latch member to the well or bush. When the latch member is freed for rotation at the place of installation, the latch member is driven in the well or bush by hand or with an ordinary handtool such as a hammer or screwdriver.

According to another aspect of the present invention there is provided a duct mounting fixture for securing a duct to a generally channel-shaped support section having right angle flanges at the free ends of its legs or sidewalls. The duct mounting fixture is of one-piece molded plastic construction and includes a base plate having an outer side or surface defining a bearing plate against which an endwall of the duct to be secured is adapted to bear. A well or bush is provided in the middle zone of the base plate. Retaining means on the underside of the base plate are provided for detenting or resiliently clamping the mounting fixture on the flanges of the support section. A latch member is joined to said base plate by frangible connecting means defining a standby position of the latch member axially spaced from an operative position in the well or bush. The well or bush is adapted to receive and rotatably mount the latch member when the connecting means are ruptured or severed.

In any event the underside of each of the lobes of the latch member preferably has at least one generally inclined or tapered surface with respect to the axis of its shank. The inclined or tapered surfaces on the latch member advantageously facilitate, during its rotation, engagement with the endwall of the duct to be gripped.

Preferably the inclined or tapered surfaces are formed on a resilient portion of the lobes which simply and advantageously takes up manufacturing tolerances and notably compensates for possible differences of thickness of the endwalls of the ducts while resiliently firmly securing the duct on its support section.

As a corollary, if, as above, one of the retaining teeth is carried by a resilient arm which facilitates resilient clamping or detenting, by mere resilient deformation, of the duct mounting fixture on the support section, and which also facilitates the releasing of the duct from the support section if desired. The other retaining tooth is, on the contrary, preferably carried by a rigid or semirigid wall portion of the associated plate. The other retaining tooth is thereupon capable of ensuring in combination with the wall portion on which it is carried, a positive abutment of the duct mounting fixture on the support section on which it is secured thereby better locating the position of the duct mounting fixture on the support section and on the other hand giving it satisfactory holding strength, that is, resistance to the duct mounting fixture being pulled off the support section.

The rigid or semirigid nature of the wall portion on which the other retaining tooth is formed is of course not mandatory. On the contrary, the wall portion may give resiliently within certain limits which advantageously permits the duct mounting fixture to be employed on various types of support sections.

In this respect the present mounting fixture is preferably equipped with two separate pairs of retaining teeth for two different types of support sections, one for generally U-shaped support sections having inwardly directed flanges referred to as U-shaped support sections and one for generally support sections having outwardly directed flanges referred to as omega-shaped support sections. And owing to the resilient deformability of the rigid or semirigid wall portion the mounting fixture according to the invention may be secured on support sections of different dimensions as is the case with support sections having outwardly directed flanges.

In short, the mounting fixture according to the invention advantageously permits a duct to be secured to any kind of support section with the aid of a simple handtool, ensures that the duct on the support section has an accurately determined mounting plane along an accurately determined direction regardless of the type of support section and thus the duct is absolutely straight regardless of the support section, and in conjunction therewith the mounting fixture has a highly satisfactory holding strength.

Preferably, the mounting fixture is advantageously made of only plastic material which ensures the sought insulation between the support section and the duct. And since such a mounting fixture has incorporated therein all the components necessary for its securement of the duct, it advantageously avoids having to look for or manipulate and position any separate fastening member.

In French printed patent application No. 2,416,577, there is disclosed a duct mounting fixture on which a duct is adapted to be secured by detenting or resilient clamping. But in this patent the support member is necessarily a perforate plate. Further, a different model of the duct mounting fixture is required for each duct width. Finally, the ducts to be secured must have transverse slots in their sidewalls or legs. Accordingly, such a duct mounting fixture is suitable for a particular use only.

It is likewise the case with known mounting fixtures which can be used with only one type of support section, which require shims for adapting it to another kind of support section and which, moreover, require the use of a separate fastening member for securement of a duct thereto. Such is advantageously not the case with mounting fixtures according to preferred embodiments of the invention.

BRIEF DESCRIPTION OF THE DRAWINGS

These and other features and advantages of the invention will become apparent from the description which follows, given by way of example, with reference to the accompanying schematic drawings.

FIG. 1 is a perspective view of a duct mounting fixture according to the invention;

FIGS. 2 and 3 are larger scale sectional views taken along lines II—II and III—III in FIG. 1, before the latch member is driven to its operative position and the frangible connecting means are ruptured or severed;

FIG. 4 repeats, on a larger scale, the portion enclosed within box IV in FIG. 2;

FIG. 5 is a longitudinal sectional view showing part of FIG. 2 after the latch member has been driven to its operative position;

FIGS. 6A and 6B are different scale sectional views of the duct mounting fixture illustrating the installation on an omega-shaped support section;

FIGS. 7A and 7B are perspective views illustrating the installation of a duct on a mounting fixture;

FIG. 8 is a view similar to that of FIG. 6B for a G-shaped support section;

FIGS. 9 and 10 are partial perspective views which are similar to that of FIG. 1 illustrating two modified embodiments according to the invention; and FIG. 11 is a fragmentary perspective view similar to FIG. 1 showing a modified form of the invention.

DESCRIPTION OF THE PREFERRED EMBODIMENTS

Generally speaking, as illustrated in the drawings, a duct mounting fixture 10 is adapted to secure any kind of duct 11 on any kind of support section 12, FIGS. 7A and 7B. The duct 11 which is adapted to house electrical conductors is not part of the actual invention and will not be described in detail. In the illustrated embodiments the duct 11 is made of plastic and comprises an endwall 13 and two sidewalls or legs 14 and therefore has a U-shaped or channel-shaped cross-section.

As illustrated, the endwall 13 has uniformly longitudinally spaced slot-like openings 15 along its center line. As for the sidewalls 14 of the duct 11, they may have uniformly spaced slits (not shown) running from their free edges for receiving electrical conductors. Alternatively there may be holes instead of the slits or the sidewalls 14 of the duct may be nonperforate.

The support section 12 on which the duct 11 is to be secured is likewise of known generally U-shaped or channel-shaped configuration. According to current standards, the support section 12 comprises an endwall 16 and two sidewalls or legs 17 having right-angle flanges along the distal ends thereof. In the illustrated embodiment of FIGS. 6A, 6B, 7A and 7B the height h of each of the sidewalls 17 is the same and the right angle flanges 18 are outwardly directed, away from each other. Such a support section has a so-called omega-shaped or hat-shaped cross section.

In FIGS. 6A, 6B and 7A, 7B the support section is not a standardized configuration but is commonly used, 35 mm×15 mm, which, as is known, distinguishes from the standard support section (CEI) TH 23-15 by a greater distance between the sidewalls 17 and a lesser thickness of the sidewalls and the endwall 16. In both cases the distance D1 between the free edges of the right angle flanges 18 is the same.

As a variation, see FIG. 8, the support section 12 may have sidewalls of different heights, and right angle flanges 18 at different levels, directed inwardly toward each other. In this case the support section is of the so-called G-shaped cross section type, G 32, CEI standard.

The distance D2 between the free edges of the right angle flanges 18 of the support section is then different from the distance D1 noted above and in practice is smaller than that distance. On the other hand the height H of its higher sidewall measured from the outer side of the right angle flange 18 thereof and the outer side of the endwall 16, is equal to that of the sidewalls of the omega-shaped cross section support sections measured in the same manner.

Such omega-shaped and G-shaped support sections are commonly used in control boxes and cabinets for supporting various switchgear and control gear.

The support sections are secured by their endwalls 16 on the struts or uprights with which the control box or cabinet is fitted. In practice the spacing of adjacent fasteners on the uprights along the center line of their "opening" or open side is identical to the spacing of the openings 15 in the duct 11. In this context "opening" is intended to mean the free passageway between the right angle flanges 18 projected against the endwall of the support section.

The center line A of such an opening is therefore in practice at the midpoint between the respective distances D1 and D2 as schematically illustrated in FIGS. 6 and 8.

In the illustrated embodiments the duct mounting fixture 10 according to the invention comprises a base plate 20 of generally rectangular configuration with rounded corners. The outer side or surface 21 of the base plate 20 is generally planar which defines a bearing plane against which the outer side of the endwall 13 of the duct 11 is adapted to bear.

The duct mounting fixture 10 further comprises in the middle zone of the outer side or surface 21 of the base plate 20 means for receiving a fastening member which is adapted to extend through the endwall 13 of a duct 11 via an opening 15, for gripping the endwall 13. In the preferred construction the means for receiving the fastening member comprises a well or bush 22 disposed substantially perpendicularly to the outer side or surface 21 of the base plate 20.

Further, in the preferred embodiment illustrated, the fastening member 23 is contiguous with the base plate and permanently held on the base plate 20, and it therefore equips the duct mounting fixture 10 from the outset, along the axis A' of the well or bush 22 in the base plate 20.

In practice the fastening member 23 comprises a latch member adapted to rotate 90°. The shank 24 of the latch member is disposed along the axis A' of the well or bush 22 in the base plate 20 and adapted to rotate therein when the latch member is in its operative position.

The shank 24 has two transverse shoulders 25 facing each other and spaced a distance d from each other. Two other shoulders 26 facing away from each other and also spaced a distance d from each other are provided on the base plate 20 and more particularly on the well or bush 22. One of the shoulders 26 is in practice formed by the free edge or lip at the outer end of the well or bush 22. The shoulders 25 are adapted to axially enclose the shoulders 26 for journaling the latch shank 24.

In practice a frustoconical or tapered engagement surface 27 is provided along the shank 24 adjoining the shoulder 25 closest to the free end of the shank.

As illustrated in FIGS. 1-4 the latch member is formed in one piece with the base plate 20, and in practice the latch member and base plate 20 are of unitary molded plastic construction.

The shank 24 of the latch member is attached to the base plate 20 only by frangible connecting means.

As best viewed in FIG. 4, the frangible connecting means is established between the lip or edge of the well or bush 22 in the base plate 20 and the smaller base of the tapered engagement surface 27 and comprises plural discrete connecting means defined by a plurality of separate or discrete bridges or strips 29. Alternatively, the frangible connecting means may be defined by a circularly continuous web.

In the illustrated embodiments the shank 24 of the latch member has smaller diameter projection 28 beyond the frustoconical engagement surface 27.

The head 30 of the latch member 23 as viewed in a plane perpendicularly to the axis of shank 24, which in practice coincides with the axis A' of the well or bush 22 in base plate 20, has an oblong contour complementary to that of the slot-like openings in the duct 11. The head therefore forms two lateral lobes 31 in alignment with each other extending in opposite directions from axis A' of well or bush 22 and of the shank 24.

Preferably, and in a symmetrical arrangement with respect to the axis A', each of the lobes 31 has along its underside facing base plate 20 an inclined or oblique surface 32 at an angle with respect to axis A'. Preferably, the inclined surface 32 on each of lobes 31 of head 30 is formed on resiliently deformable portions of the respective lobes. As shown in FIGS. 1-8 such a resiliently deformable portion may result from the cantilevering of the lobes 31 with respect to the latch shank 24.

Alternatively, see FIGS. 9 and 10, the lobes may be connected to the main part of the head through a slitted zone. In the embodiment of FIG. 9 the slit extends parallel to axis A' of latch shank 24 and generally perpendicularly to the bearing plane defined by the outer surface 21 of the base plate 20. In the FIG. 10 embodiment the slit 34 is perpendicular to the axis A' of the latch shank 24 and cuts through the thickness of the associated lobe 31, and lies generally parallel to the bearing plane defined by the outer surface 21 of the base plate 20.

As shown, the head 30 of the latch member 23 has a slot 36 for its rotation in the various illustrated embodiments.

The duct mounting fixture 10 according to the invention comprises at least two retaining teeth 37, 38 which are disposed on the underside or inner side of the base plate 20 and adapted to cooperate with right angle flanges 18 on the omega-shaped support section 12, at least retaining tooth 37 being carried by a resilient arm 40. In practice both retaining teeth 37, 38 extend transversely or at right angles to the base plate 20 on opposite sides of the latch member defined by the, fastening member 23. Also, in practice the resilient arm 40 carrying retaining tooth 37 is cantilevered from root zone 41 generally defining a hinge parallel to the axis A' of the latch shank 24.

The resilient arm 40 is preferably accessible from outside of the base plate 20. For example, as shown in solid lines in the drawings, the outer edge of the resilient arm 40 lies flush with the outer surface 21 of the base plate 20 and resilient arm 40 traverses the base plate 20 through an opening 42 therein. Thus the resilient arm 40 is accessible to the exterior of the base plate 20.

Further, as shown in FIG. 11, the resilient arm 40 may have a projection 43 at its free end which extends through a cutout 44 in the edges wall to the peripheral edge of the base plate 20.

Aside from any possible edge cutouts 44 the opening 42 through the base plate 20 has a continuous periphery so that the structural weakening of the base plate 20 is minimized. As a corollary the other retaining tooth 38 is preferably carried by a rigid or semirigid partition or wall portion 45 of the base plate 20.

Since the retaining teeth 37, 38 are adapted to cooperate with a symmetrical support section they are directed toward each other, the rigid or semirigid wall portion 45 carrying retaining tooth 38 forming one of the transverse edges of the base plate 20 and the resilient arm 40 carrying retaining tooth 37 extending proximate to the other transverse edge of the base plate, substantially parallel to the first.

In practice the wall portion 45 and the resilient arm 40 and their respective retaining teeth 37,38 are equidistant from the axis A' of the latch shank 24, this distance d1 being to half the distance D1 defined above.

Preferably, the retaining tooth 37, at least, has an adjoining tapered engagement surface 47 forwardly thereof, and likewise in the illustrated embodiment the retaining tooth 38 has an adjoining tapered engagement surface 48 forwardly thereof.

In any event respective bearing surfaces 49, 50 are associated with the retaining teeth 37,38 on the underside of the base plate 20 parallel to the outer side or surface 21 thereof, which bearing surfaces 49, 50 are adapted to abut against the right-angle flanges 18 of the support section on which the mounting fixture is installed. Where, as here, the retaining teeth 37, 38 are adapted to cooperate with an omega-shaped support section, the bearing surfaces 49 and 50 are coplanar and they are therefore at the same distance h from the outer side or surface 21 of the base plate 20.

In practice, in the preferred illustrated embodiment the mounting fixture 10 has two pairs of retaining teeth, cooperable with different types of generally channel-shaped or U-shaped support sections. In addition to the retaining teeth 37, 38 adapted to cooperate with an omega-shaped support section, there are retaining teeth 37', 38' adapted to cooperate with a so-called G-shaped support section.

In accordance with features similar to those described above, retaining tooth 37' is carried by a resilient arm 40' which traverses base plate 20 through opening 42' and extends generally transversely and at right angles to the base plate 20 from a root zone 41' defining a hinge axis parallel to axis A' of the latch shank 24. The outer edge of the resilient arm 40' lies flush with the outer surface of side 21 of the base plate 20. Optionally a projection 43' of the resilient arm protrudes into cutout 44' in the edge wall of the base plate 20. Similarly, the retaining tooth 38' is carried by a rigid or semirigid portion 45' of the base plate 20.

Since the retaining teeth 37, 38 are adapted to cooperate with a G-shaped support section, they are directed in opposite directions to each other.

In practice, as above, the wall portion 45' and the resilient arm 40' carrying retaining teeth 37', 38' are equidistant from the axis A' of the latch shank 23, this distance d2 being equal to half the distance D2 defined above.

Finally, bearing surfaces 49' 50' are associated with each of the retaining teeth 37', 38' parallel to the outer side or surface 21 of the base plate 20.

In the illustrated embodiment the resilient arms 40, 40' carrying the retaining teeth 37, 37' are disposed on the same side of the latch member defined by the fastening member 23 and in conjunction therewith the rigid or semirigid wall portions 45, 45' carrying retaining teeth 38, 38' are disposed on the other side of the latch member.

Further, in this embodiment the bearing surfaces 49, 49' associated with the retaining teeth 37, 37' are in continuation of each other such that the bearing surface 49' associated with the retaining tooth 37' is at a distance h from the outer side or surface 21 of the base plate 20. On the other hand bearing surface 50' associated with the retaining tooth 38' is at a distance h' from the outer side or surface 21 which is different from, and in practice greater than, distance h.

In the illustrated embodiment the bearing surface 50' is formed on the underside of a ledge 52 protruding from the rigid or semirigid wall portion 45' of the base plate 20 and parallel to the associated retaining tooth 38'. For ease of molding the retaining tooth 38' is divided into two separate sections on opposite sides of the ledge 52, as best seen in FIG. 3.

In the illustrated embodiment the ledge 52 is connected to the rigid or semirigid wall portion 45' by stiffening ribs 53.

If, as described above, the latch member is initially attached by frangible connecting means to the base plate 20, and more particularly to the well or bush 22 therein, the latch member is driven inwardly to its operative position when the mounting fixture is to be put into service. The driving-in of the latch member may be facilitated by using some sort of handtool such as a hammer or screwdriver.

In any event it is a simple handtool readily available to an electrician or handyman.

During the driving-in of the latch member the shank 24 is caused to engage the well or bush 22 and there is a temporary elastic deformation of the well 22 by the engagement of the corresponding tapered engagement surface 27 on shank 24 until the shoulders 25 thereon come into registry with the corresponding shoulders 26 of the well or bush 22, the shoulders 25, 26 abutting against one another as illustrated in FIG. 5. Thereupon the latch member is rotatably mounted by its shank 24 in the well or bush 22 in the base plate 20. It is permanently seated in the well or bush 22, too.

The latch member may be driven into the well or bush 22 in the workshop or, alteratively, at the place of ultimate use.

With reference to FIGS. 6 and 7 the mounting fixture 10 is intended to be fitted on an omega-shaped support section First of all, the retaining tooth 38 engages right angle flange 18 by introducing the mounting fixture 10 in the direction of arrow F1 at an angle (FIG. 6A), then the mounting fixture is swung in place about right angle flange 18. During the swinging movement, there is a temporary resilient deformation of resilient arm 40 carrying retaining tooth 37 until the retaining tooth comes into alignment with the inner surface of the right angle flange 18 of the support section 12. The retaining tooth 37 is thus engaged under the flange 18 thereby enabling the resilient return of the resilient arm 40 to its initial position FIG. 6B. The duct mounting fixture 10 is thus installed by detenting or resiliently clamping on the support section 12. Thereupon the duct mounting fixture 10 is firmly secured to the support section 12.

It follows from the foregoing that axis A' of latch shank 24 then coincides with the center line A of opening or open side of the support section 12. Thus it will be understood since the support section has a symmetrical omega-shaped configuration, the mounting fixture may be installed in either direction, starting with retaining tooth 37 or retaining tooth 38.

In the immediately following description it will be assumed that the duct 11 to be secured on the support section 12 is to be oriented crosswise thereto. The lobes 31 of the head 30 of the latch member are then disposed at right angles to the support section, FIG. 7A, and the head 30 extends through one of the openings 15 in endwall of the duct 11. Thereupon, simply by means of a screwdriver, the latch member is turned 90°, FIG. 7B, so that the lobes 31 of the head 30 bearing on the inner surface of the endwall 13 of duct 11, the latter is then firmly secured to the mounting fixture 10 and thereby to the support section itself.

As it will be understood, during rotation of the latch member through 90°, the inclined surfaces 32 on the underside of lobes 31 advantageously facilitate the engagement of the lobes 31 with the underside of the endwall 13 of duct 11 by gradually rising thereon, taking into account the resilience of the resilient portions of lobes 31 carrying the inclined surfaces 32. Furthermore, as noted above, manufacturing tolerances, namely, possible differences in the thickness of the endwall 16 of the duct 11, are thus advantageously taken up.

When slits 34 are provided in the head 30 for defining the resilience the force necessary for turning the latch member is advantageously reduced.

In the foregoing description it has been assumed that the omega-shaped support section 12 is a nonstandard 35 mm×15 mm. The steps would be the same if the support section were standardized support section (CEI) -TH 35-15.

But when the mounting fixture according to the invention is installed on such a standardized support section the resilient arm 40' and its rigid or semirigid wall portion 45' are flexed, bearing in mind the dimensions thereof. That is why the wall portion 45' is actually only relatively rigid.

When, as illustrated in FIG. 8, the mounting fixture according to the invention is to be secured on a G-shaped support section, one proceeds as above but retaining teeth 37', 38' of the mounting fixture are then operative and it is necessary that fixture be introduced in a particular direction. A marking may be provided on the mounting fixture for this purpose.

As the reader will have understood the stiffening rib 53 connecting the ledge 52 on the rigid or semirigid wall portion 45' to the base plate 20 precludes the inadvertent engagement of the mounting fixture on the shorter sidewall 17 of the G-shaped support section by means of ledge 52 instead of by means of retaining tooth 38'.

In any case, as noted in FIG. 8, this engagement involves the resilient deflection of the retaining tooth 37 which is then inoperative.

The duct 11 may be easily removed by turning latch member 90° and thereafter disengaging the duct.

Likewise the mounting fixture 10 may be removed from the support section 12 to which it is secured. To this end the resilient arm 40 or 40' must be deflected, e.g., with a screwdriver, which is made easier by the fact that the resilient arm 40 or 40' is accessible from outside the base plate 20, either from the outer side of the base plate or from the peripheral edge of the base plate when the resilient arm has a projection or extension 44, 44'.

On the other hand retaining teeth 37, 38 or 37', 38' of the mounting fixture advantageously efficaciously resist inadvertent pulling of the mounting fixture 10 off the support section 12.

When, as schematically illustrated in dotted lines in FIG. 1, the resilient arm 40 or 40' carrying the operative retaining tooth 37 or 37' comprises a projection or extension 43 or 43' the abutment of the projection or extension 43 or 43' advantageously resists deformation of the resilient arm to prevent the retaining tooth from coming off the support section 12.

It will be appreciated that in any event, bearing in mind the arrangement of the bearing surfaces 49, 49', 50, 50' the duct 11 is always located at the same distance h from the support section 12 regardless of the type of support section to which it is secured.

Instead of being oriented at right angles to the support section 12 duct 11 may be oriented parallel thereto. In this event the axis of the mounting fixture advantageously coincides with the center line of the opening of the support section 12.

In any case, on account of the arrangement of the retaining teeth 37, 37', 38, 38' with respect to the axis A' of the latch shank 24 relative to which the retaining teeth are equidistant, the axis A' always coincides with center line A of the support section 12 regardless of the type of support section. In other words, as already emphasized above, the mounting fixture according to the invention is advantageously capable of accurately determining a mounting plane which is always the same with respect to the support section on which it is secured regardless of the type of support section.

As it will have been noted, when the duct mounting fixture 10 according to the invention is ready to be used it has a part movable with respect to its base plate 20 which is a latch member defined by the fastening member and rotatable mounted with respect to the base plate 20. In other words the duct 11 is secured to a support section 12 with a mounting fixture 10 which has only a single moving part which in practice is rotatable.

If follows that the friction to be overcome during securement is advantageously relatively small since it is produced between the latch member of reduced effective contact area and the bottom of the duct. The base plate 20 which is also in contact with the bottom of the duct remains advantageously stationary with respect to the same. Thus the present invention provides in combination, paradoxically, relatively simple operation and particularly firm and reliable securement.

Also securement is carried out in two steps: a first step which involves the resilient clamping or detenting action of the duct mounting fixture on the support section 12 which is very easy and a second locking step of the duct 11 on the duct mounting fixture 10 which is also very easy. Advantageously with the present duct mounting fixture it is not necessary to simultaneously deal with the securement of the duct mounting fixture on the support section and the mounting of the duct on the mounting fixture. Overall, duct mounting and securement is therefore facilitated.

The present invention is not intended to be limited to the illustrated and described embodiments but encompasses all variations and alternatives understood to those skilled in the art without departing from the scope of the appended claims.

In particular, although it is preferred fastening member 23 is not necessarily initially contiguous with the base plate as shown and described hereinabove. Alternatively the fastening member may be a self-threading or -tapping fastener to be screwed into the base plate, the thread of such a fastener biting into the inner wall of the well or bush in the base plate.

Likewise the fastening member when initially contiguous with and joined to the base plate from the outset is not necessarily a rotatable latch member. It may be a detenting member.

Also, instead of the rigid or semirigid wall portions being disposed on the same side of the latch member they may be disposed on opposite side thereof in which case the same holds true for the resilient arms.

What we claim is:

1. A duct mounting fixture for securing ducts to generally channel-shaped support sections each having a base, sidewalls and right angle flanges at distal ends of said sidewalls, said duct mounting fixture comprising a base plate having an outer side defining a bearing plane against which an endwall of a duct is adapted to bear, means for receiving a fastening member being located in a middle zone of said base plate, said fastening member being adapted to extend through an opening in an endwall of the duct and grip the endwall, two pairs of retaining teeth formed on said base plate separate and apart from said means for receiving said fastening member, said retaining teeth being disposed on an inner side of said base plate and being selectively cooperable with the right angle flanges of the corresponding support sections, said teeth of each pair of teeth being disposed on opposite sides of said means for receiving said fastening member, at least one of the retaining teeth of each of said pairs of retaining teeth being carried by a resiliently deformable arm.

2. The mounting fixture of claim 1, wherein said means for receiving said fastening member comprises a well or bush disposed substantially perpendicularly to said bearing plane defined by the outer surface of said base plate and includes a retaining shoulder at said inner surface of said base plate.

3. The mounting fixture of claim 2, wherein said fastening member is initially attached to said base plate and permanently held along the axis of said well or bush by said retaining shoulder.

4. The mounting fixture of claim 2, wherein said fastening member comprises a latch member, said latch member having a shank adapted to be mounted for rotation in said well or bush while engaging said retaining shoulder.

5. The mounting fixture of claim 4, wherein said latch member is initially rotatably mounted in said well or bush and permanently maintained therein against axial displacement by said retaining shoulder.

6. The mounting fixture of claim 4, wherein frangible connecting means initially join said latch member to said base plate in a standby position spaced axially from an operative position in said well or bush, and cooperating means on said latch member and said retaining shoulder for permanently maintaining said latch member in the operative position.

7. The mounting fixture of claim 4, wherein said latch member has a head with two transversely extending lobes in alignment with each other, undersides of said lobes having surfaces inclined relative to an axis of said shank cooperable with the endwall of a duct to be mounted thereon.

8. The mounting fixture of claim 7, wherein said lobes have resilient portions, said inclined surfaces being formed on said resilient portions.

9. The mounting fixture of claim 8, wherein said head has a main portion, a portion of reduced section being defined between said main portion and each of said resilient portions for providing the resilience thereof.

10. The mounting fixture of claim 9, wherein each of said portions of reduced section comprises a slit extending parallel to the axis of said shank and generally perpendicular to the bearing plane defined by the outer side of said base plate.

11. The mounting fixture of claim 9, wherein each of said portions of reduced section comprises a slit extending normal to the axis of said shank and generally parallel to the bearing plane defined by the outer side of said base plate.

12. The mounting fixture of claim 7, wherein said head of said latch member comprises a diametrical slot for rotating said latch member.

13. The mounting fixture of claim 4, wherein said shank of said latch member comprises axially spaced apart transverse shoulders facing each other, and said well or bush comprises complementary axially spaced apart transverse shoulders including said retaining shoulder, said latch member shoulders axially enclosing the respective shoulders on said well or bush in the operative position of said latch member, said transverse shoulders cooperating to rotatably mount said latch member in said well or bush.

14. The mounting fixture of claim 1, wherein said resilient arm extends generally at right angles to the bearing plane of said outer side of said base plate, and is cantilevered from an inner side of said base plate from a root zone on said base plate about an axis generally parallel to the axis of said means for receiving the fastening member.

15. The mounting fixture of claim 1, wherein said resilient arm is accessible from the exterior of said base plate at said outer side for releasing said resilient arm.

16. The mounting fixture of claim 15, wherein an edge of said resilient arm lies flush with said bearing plane defined by the outer side of said base plate and said resilient arm extends in an opening in said base plate.

17. The mounting fixture of claim 15, wherein said resilient arm includes an extension extending to the peripheral edge of said base plate through a cutout in a peripheral wall portion of said base plate.

18. The mounting fixture of claim 16, wherein said resilient arm includes an extension extending to the peripheral edge of said base plate through a cutout in a peripheral wall portion of said base plate.

19. The mounting fixture of claim 1, wherein each pair of said pairs of retaining teeth is adapted to a different type of support section configuration.

20. The mounting fixture of claim 19, wherein a bearing surface is associated with each of said retaining teeth and extends generally parallel to said bearing plane defined by the outer surface of said base plate, and wherein one pair of said bearing surfaces corresponds to a first support section configuration and is coplanar, and another pair of said bearing surfaces corresponds to a second support section configuration and is disposed at the same distance from said bearing plane defined by the outer surface of said base plate, whereby a distance between the support section and the duct to be secured thereon is the same regardless of the support section configuration.

21. The duct mounting fixture according to claim 2, wherein said retaining teeth are substantially spaced from said well or bush.

22. The duct mounting fixture according to claim 13, wherein a tapered engagement surface is provided proximate to the free end of the shank for facilitating movement of said latch member to its operative position in said well or bush.

23. A duct mounting fixture for securing a duct to a generally channel-shaped support section having a base, sidewalls and right angle flanges at free ends of said sidewalls, said duct mounting fixture being of one-piece molded plastic construction and comprising a base plate having an outer side defining a bearing plane against which an endwall of the duct to be secured is adapted to bear, a well or bush being provided in a middle zone of said base plate, retaining means on an inner side of said base plate for resiliently clipping said duct mounting fixture on the flanges of the support section, a latch member initially integrally joined to said base plate by frangible connecting means and defining a standby position of said latch member axially spaced from an operative position retained in said well or bush, means adapted to permanently axially mount said latch member in said well or bush for rotation when said connecting means are ruptured or severed, said latch member in said operative position being adapted to extend through an opening in the endwall of the duct and grip the endwall.

24. A duct mounting fixture for securing a duct to a generally channel-shaped support section having right angle flanges at the free ends of its legs or sidewalls, said duct mounting fixture being generally of molded plastic construction and comprising a base plate having an outer side defining a bearing plane against which an endwall of the duct to be secured is adapted to bear, a well or bush provided in a middle zone of the base plate, retaining means on an inner side of said base plate for resiliently clipping said duct mounting fixture on the flanges of the support section, a latch member rotatably mounted in said well or bush, and means for permanently axially retaining said latch member in said well or bush, said latch member being adapted to extend through an opening in the endwall of the duct and grip the endwall.

25. The duct mounting fixture according to claim 24, wherein said means for permanently axially retaining said latch member in said well or bush comprises cooperable shoulders defined on said latch member and on said bush or well for preventing axial displacement of said latch member.

26. The duct mounting fixture according to claim 27, wherein said retaining means is separate from and is substantially spaced from said well or bush.

27. The duct mounting fixture according to claim 28, wherein said retaining means comprises two pairs of retaining teeth for two different respective channel-shaped support sections, said retaining teeth being separate from and substantially spaced from said well or bush.

* * * * *